United States Patent

Lin

Patent Number: 5,361,568
Date of Patent: Nov. 8, 1994

[54] LAWN MOWER

[76] Inventor: Yung-Ching Lin, No. 8, Lane 762, Chung-Shan N. Rd., Yung-Kang Hsiang, Tainan Hsien,

[21] Appl. No.: 193,264

[22] Filed: Feb. 8, 1994

[51] Int. Cl.$^5$ .............................................. A01D 34/12
[52] U.S. Cl. ........................................ 56/194; 56/202
[58] Field of Search ............... 56/194, 202, 199, 200, 56/203, 248, DIG. 8

[56] References Cited

U.S. PATENT DOCUMENTS 4,924,664  5/1990  Hicks et al. ............................ 56/202
4,969,320  11/1990  Langford ............................. 56/16.6

FOREIGN PATENT DOCUMENTS 2101864  1/1983  United Kingdom .

*Primary Examiner*—Ramon S. Britts
*Assistant Examiner*—Pamela A. O'Connor
*Attorney, Agent, or Firm*—Willian Brinks Hofer Gilson & Lione

[57] ABSTRACT

A lawn mower includes a blade support with a recess formed in the bottom side thereof and an outlet portion. A blade is mounted rotatably within the recess. A grass collecting unit has an inlet portion communicated with the outlet portion of the recess so as to collect grass that was cut from a lawn with the use of the blade. Several ventilation holes are formed through a wall of the grass collecting unit so as to reduce air pressure inside the grass collecting unit. The grass collecting unit has a positioning hole formed through the top wall thereof. A grass indicating unit includes a body member disposed in the positioning hole and capable of being pushed upward relative to the top wall of the grass collecting unit by virtue of air pressure inside the grass collecting unit, and a positioning assembly mounted securely on the body member so as to prevent removal of the body member from the top wall of the grass collecting unit. Accordingly, when grass within the grass collecting unit clogs the ventilation holes, the air pressure within the grass collecting unit is increased so as to push upward and protrude the body member from the top wall of the grass collecting unit so as to indicate to the user when adjustment of the amount of the collected grass within the grass collecting unit is required.

4 Claims, 5 Drawing Sheets

LAWN MOWER

BACKGROUND OF THE INVENTION

1. Field of the Invention

This invention relates to a lawn mower, more particularly to a lawn mower which has a grass indicating unit that is installed in a grass collecting unit of the lawn mower so as to show an approximate amount of grass within the grass collecting unit.

2. Description of the Related Art

The improvement of this invention is directed to a conventional lawn mower 1, as shown in FIG. 1, which includes a blade support 11, an engine 12, a handle 13, a blade 14, and a grass collecting unit 15. The blade support 11 has a recess which is formed in the bottom side thereof and which has an outlet portion. The engine 12 is mounted on the top side of the blade support 11. The handle 13 extends rearward from the rear portion of the blade support 11. The blade 14 is mounted rotatably within the recess of the blade support 11. The grass collecting unit 15 is mounted removably on the rear portion of the blade support 11 and has an inlet portion communicated with the outlet portion of the recess of the blade support 11 so as to collect grass that was cut from a lawn with use of the blade 14. A plurality of ventilation holes 151 are formed through a wall of the grass collecting unit 15 near the upper portion of the same so as to reduce air pressure inside the grass collecting unit 15. Note that in the conventional lawn mower 1, the user cannot determine when adjustment of the amount of the collected grass within the grass collecting unit 15 is required. Thus, the ventilation holes 151 may be clogged by the collected grass when the collected grass almost fills the grass collecting unit 15. The air pressure within the grass collecting unit 15 is increased, thereby resulting in a resisting force which may reduce the speed of rotation of the blade 14. Accordingly, the utility of the lawn mower 1 is limited.

SUMMARY OF THE INVENTION

The main objective of this invention is to provide a lawn mower which has a grass indicating unit that is installed in a grass collecting unit of the lawn mower so as to show an approximate amount of grass within the grass collecting unit.

According to this invention, a lawn mower includes a blade support, a blade, a grass collecting unit, and a grass indicating unit. The blade support has a recess which is formed in the bottom side of the blade support and which has an outlet portion. The blade is mounted rotatably within the recess of the blade support. The grass collecting unit is mounted removably on the rear portion of the blade support and has an inlet portion which is communicated with the outlet portion of the recess of the blade support so as to collect grass that was cut from a lawn with use of the blade, and a plurality of ventilation holes formed through a wall of the grass collecting unit so as to reduce air pressure inside the grass collecting unit. The grass collecting unit has a top wall and a positioning hole which is formed through the top wall and which allows the grass indicating unit to be installed therein. The grass indicating unit includes a body member and a positioning assembly. The body member is disposed in the positioning hole of the grass collecting unit and is capable of being pushed upward relative to the top wall of the grass collecting unit by virtue of the air pressure inside the grass collecting unit. The positioning assembly is mounted securely on the body member so as to prevent removal of the body member from the top wall of the grass collecting unit. Accordingly, when grass within the grass collecting unit clogs the ventilation holes, the air pressure within the grass collecting unit is increased so as to push upward and protrude the body member from the top wall of the grass collecting unit. With the protruded body member, the user can determine when adjustment of the amount of the collected grass within the grass collecting unit is required.

BRIEF DESCRIPTION OF THE DRAWING

Other features and advantages of this invention will become apparent in the following detailed description of the preferred embodiments of this invention, with reference to the accompanying drawing, in which.

DETAILED DESCRIPTION OF THE PREFERRED EMBODIMENTS

Figure 1:
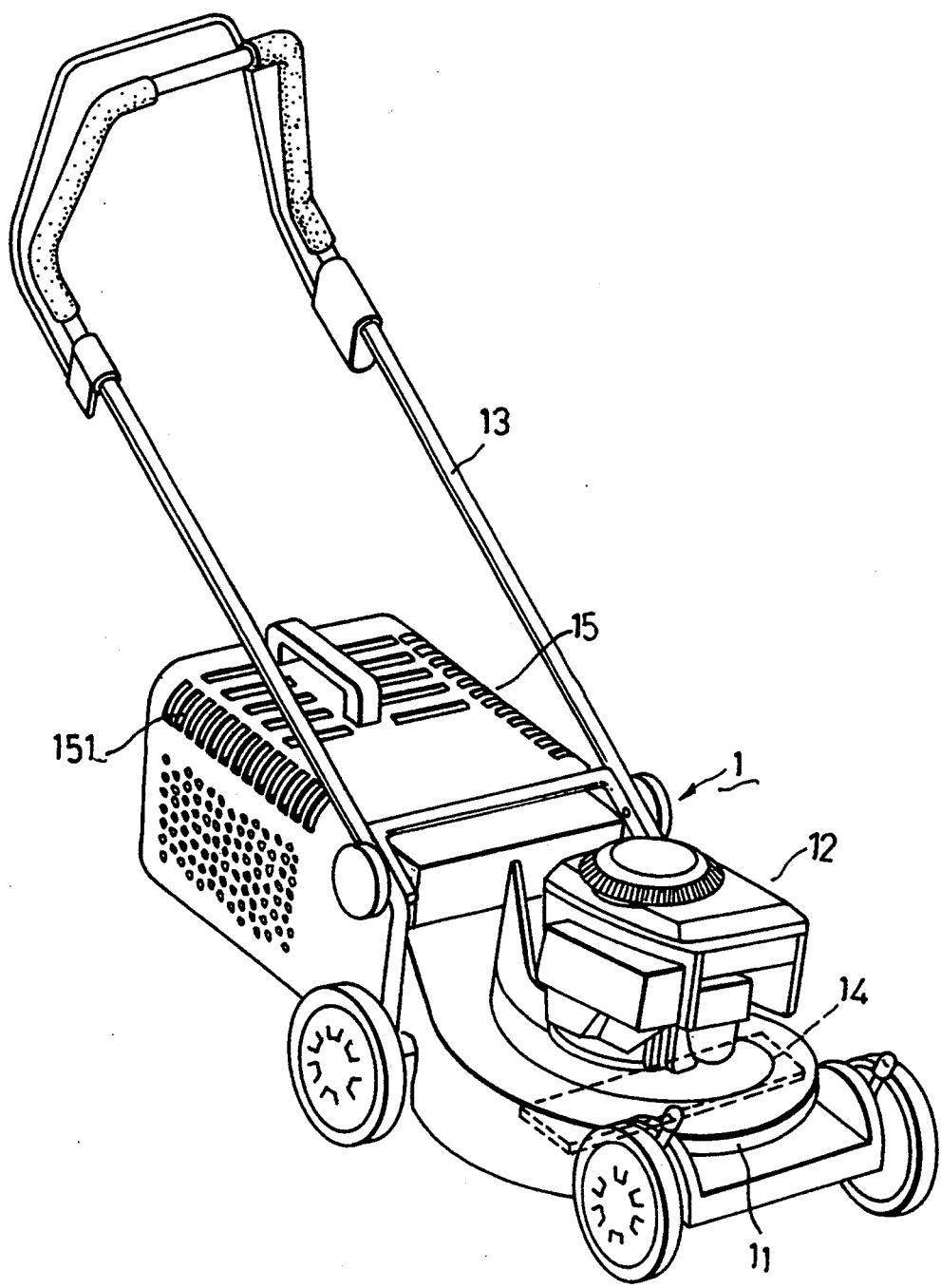
FIG. 1 is a perspective view of a conventional lawn mower.
Figure 2:
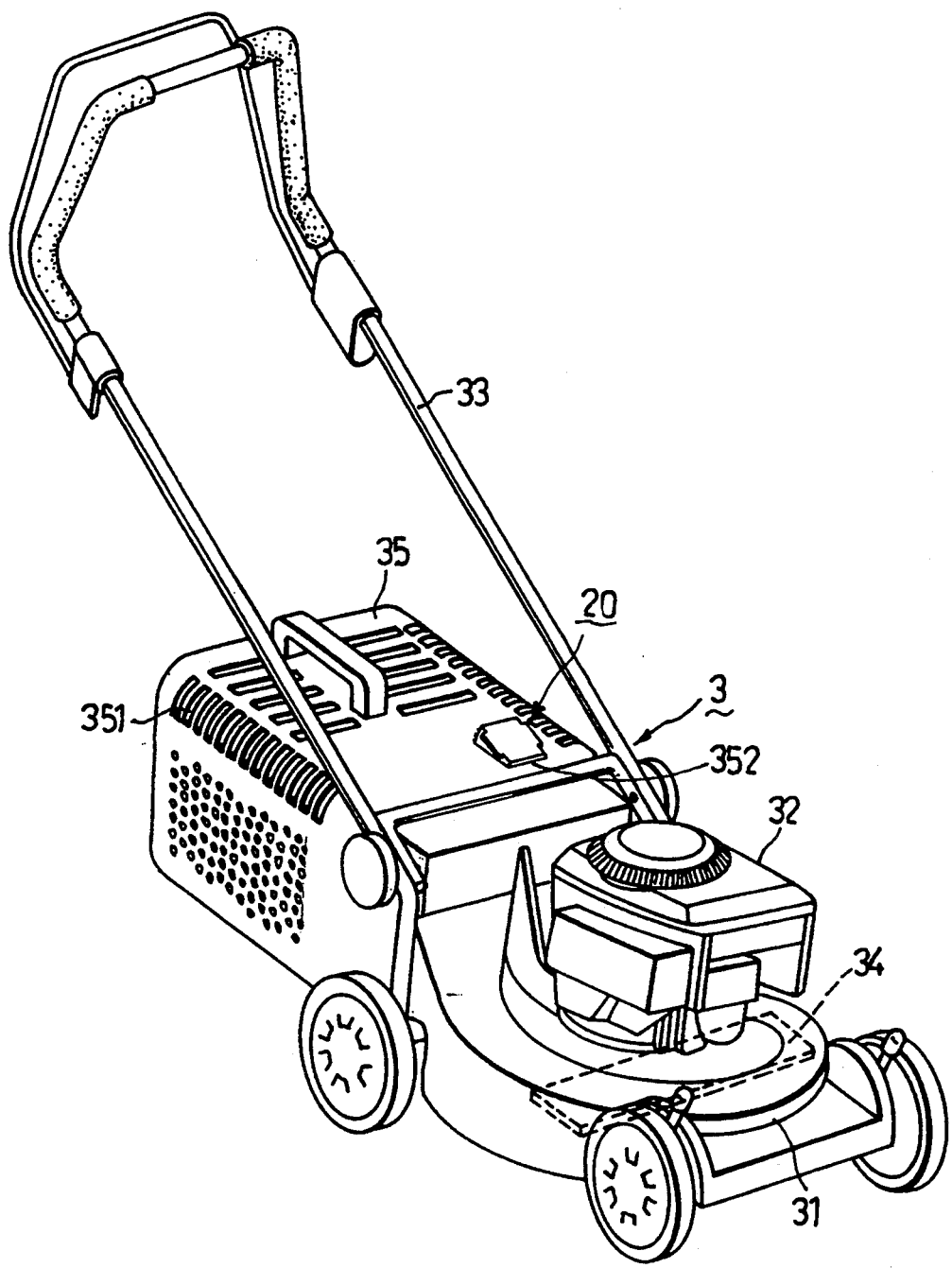
FIG. 2 is a perspective view showing a lawn mower which has a grass indicating unit that is installed in a grass collecting unit of the lawn mower according to the first preferred embodiment of this invention.

Referring to the FIG. 2, a lawn mower 3 of the first preferred embodiment of this invention includes a blade support 31, an engine 32, a handle 33, a blade 34, a grass collecting unit 35, and a grass indicating unit 20. The blade support 31 has a recess which is formed in the bottom side thereof and which has an outlet portion (not shown). The engine 32 is mounted on the top side of the blade support 31. The handle 33 extends rearward from the rear portion of the blade support 31. The blade 34 is mounted rotatably within the recess of the blade support 31. The grass collecting unit 35 is mounted removably on the rear portion of the blade support 31 and has an inlet portion (not shown) which is communicated with the outlet portion of the recess of the blade support 31 so as to collect grass that was cut from a lawn with the use of the blade 34. A plurality of ventilation holes 351 are formed through a wall of the grass collecting unit 35 near the upper portion of the same so as to reduce the air pressure inside the grass collecting unit 35. The grass collecting unit 35 has a top wall and a rectangular positioning hole 352 which is formed through the top wall and which allows the grass indicating unit 20 to be installed therein.

Figure 3:
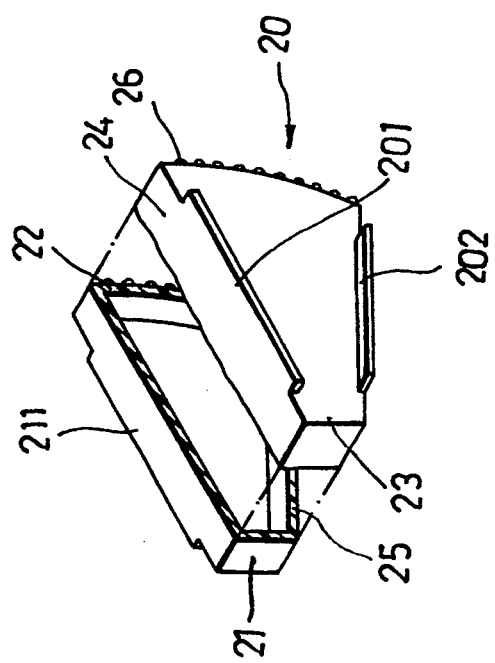
FIG. 3 is a perspective, partly sectional view of the grass indicating unit of the first preferred embodiment of the lawn mower of this invention.

Referring to FIGS. 2 and 3, the grass indicating unit 20 has a body member which is disposed in the positioning hole 352 of the grass collecting unit 35 (see FIG. 2) and which includes a generally vertical front wall 21 which has a height that is equal to the thickness of the top wall of the grass collecting unit 35 and which is positioned in the positioning hole 352 near the inlet portion of the grass collecting unit 35. A generally vertical rear wall 22 has a height greater than that of the front wall 21 and a curved outer surface that enables the rear wall 22 to rotate relative to the top wall of the grass collecting unit 35 (see FIG. 4). A pair of generally trapezoid side walls 23 interconnect the front and rear walls 21, 22. A top wall 24 is mounted securely on the top ends of the front, rear, and side walls 21, 22, 23. A bottom wall 25 is mounted securely on the bottom ends of the front, rear, and side walls 21, 22, 23. A scale portion 26 is provided on the curved outer surface of the rear wall 22 so as to show an approximate amount of grass within the grass collecting unit 35. The grass indicating unit 20 further has a positioning assembly which includes a pair of first positioning plates 201 that project outward from the top ends of the side walls 23 of the body member respectively and that rest on the top surface of the top wall of the grass collecting unit 35 so as to prevent the body member of the grass indicating unit 20 from falling into the grass collecting unit 35, and a pair of second positioning plates 202 that project outward from the bottom ends of the side walls 23 of the body member respectively and that rest on the bottom surface of the top wall of the grass collecting unit 35 so as to prevent removal of the body member from the top wall of the grass collecting unit 35.

Figure 4:
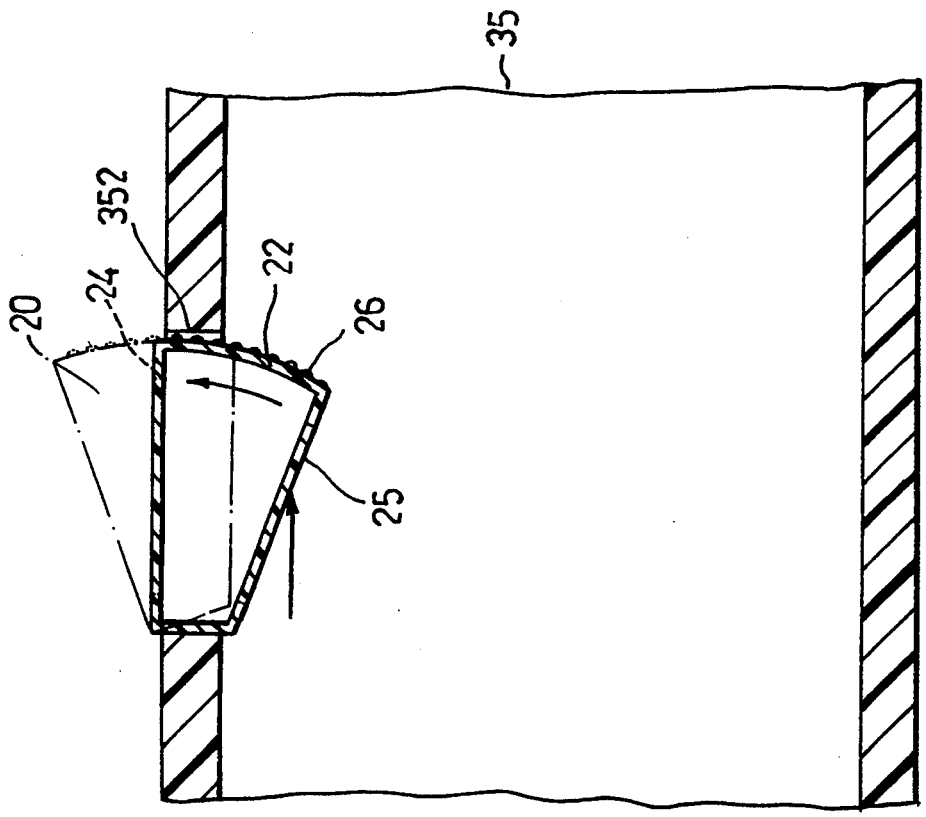
FIG. 4 is a schematic view illustrating the operation of the grass indicating unit of the lawn mower in accordance with the first preferred embodiment of this invention.

Referring to FIG. 4, when grass within the grass collecting unit 35 clogs the ventilation holes 351 (see FIG. 2), the air pressure within the grass collecting unit 35 is increased, thereby pushing upward and protruding the body member of the grass indicating unit 20 from the top wall of the grass collecting unit 35. Owing to the upward movement of the body member, the user can adjust the amount of the collected grass within the grass collecting unit 35 upon seeing the scale portion 26 of the body member, thereby removing the collected grass from the grass collecting unit 35 before the collected grass fills the grass collecting unit 35.

Figure 5:
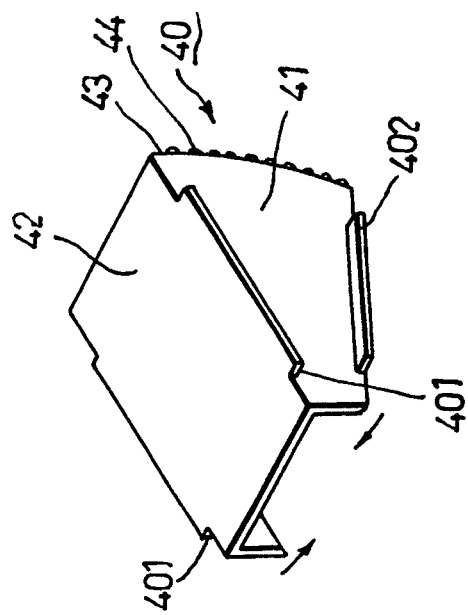
FIG. 5 is a perspective view showing a grass indicating unit according to the second preferred embodiment of the lawn mower of this invention.

FIG. 5 shows the modified grass indicating unit 40 of the second preferred embodiment of the lawn mower of this invention. As shown, the grass indicating unit 40, with the same function as the first embodiment, has a body member which is disposed in the positioning hole 352 of the grass collecting unit 35 (see FIG. 2) and which includes a pair of generally trapezoid side walls 41, each of which having a rear side with a height greater than the thickness of the top wall of the grass collecting unit 35 (see FIG. 2), and a front side that is located at a position near the inlet portion of the grass collecting unit 35 (see FIG. 2) and that has a height equal to the thickness of the top wall of the grass collecting unit 35 (see FIG. 2). A top wall 42 interconnects the top ends of the side walls 41. A rear wall 43 interconnects the rear sides of the side walls 41 and has a curved outer surface which enables the rear wall 43 to rotate relative to the top wall of the grass collecting unit 35 (see FIG. 2). A scale portion 44 is provided on the curved outer surface of the rear wall 43 so as to show an approximate amount of the collected grass within the grass collecting unit 35 (see FIG. 2). The grass indicating unit 40 further has a positioning assembly which includes a pair of first positioning plates 401 that project outward from the top ends of the side walls 41 of the body member respectively, and a second positioning plates 402 that project outward from bottom ends of the side walls 41 of the body member respectively. The first and second positioning plates 401, 402 have the same function as those of the positioning assembly of the first embodiment, and can prevent removal of the body member of the grass indicating unit 40 from the top wall of the grass collecting unit 35 (see FIG. 2).

Figure 6:
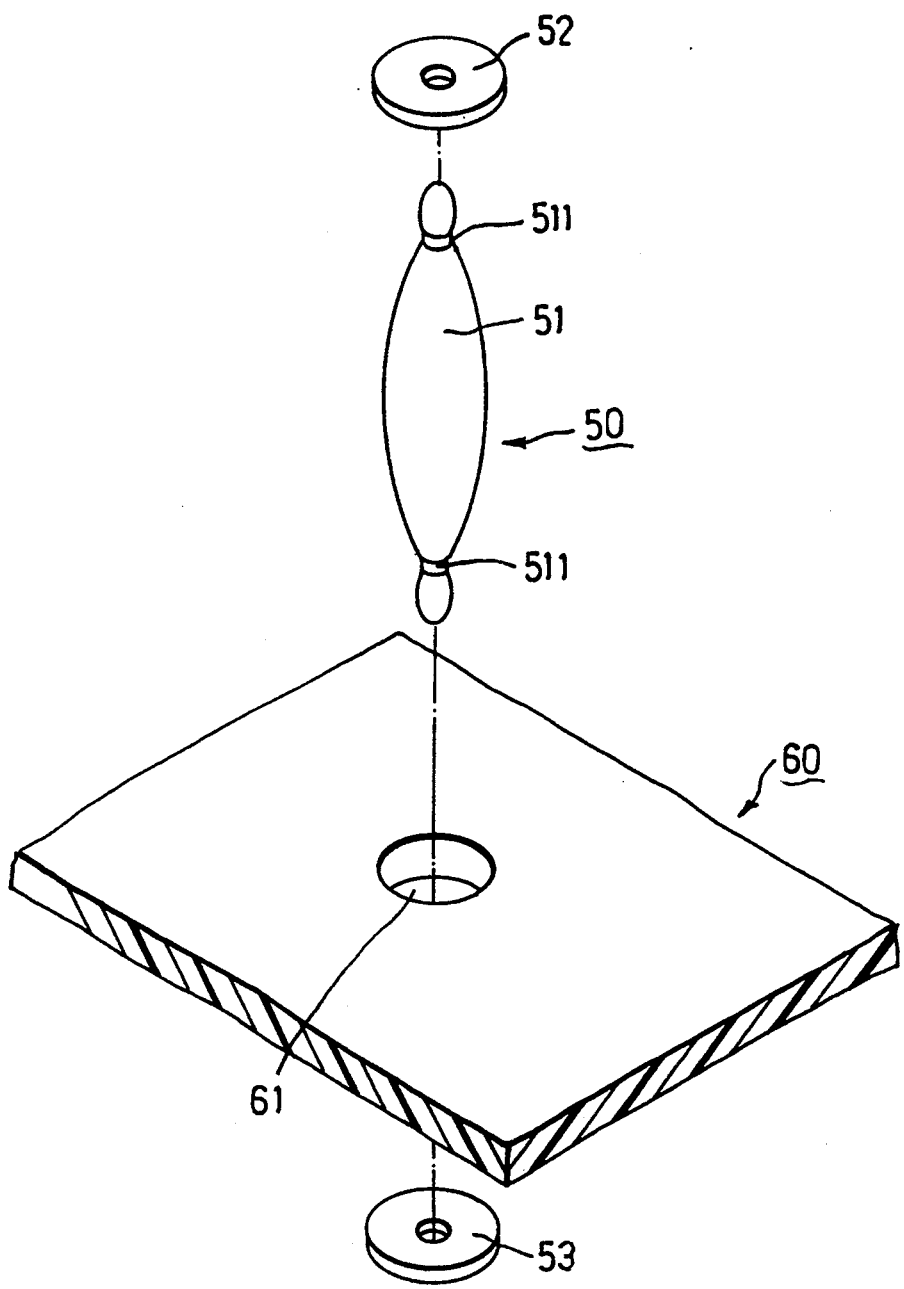
FIG. 6 is an exploded view showing a grass indicating unit according to the third preferred embodiment of the lawn mower of this invention.

FIG. 6 shows the modified grass indicating unit 50 and grass collecting unit 60 (only the top wall of grass collecting unit 60 is shown) of the third embodiment of the lawn mower of this invention. As shown, the grass collecting unit 60 has a circular positioning hole 61 formed in the top wall thereof. The grass indicating unit 50 is disposed in the positioning hole 61 and has a body member which includes an elongated upright body 51 that is sized so as to be movable through the positioning hole 61 and which has two annular grooves 511 formed respectively in upper and lower end portions thereof. An upper retaining ring 52 engages the upper annular groove 511 of the upright body 51. A lower retaining ring 53 engages the lower annular groove 511 of the upright body 51. The outer diameters of the upper and lower retaining rings 52, 53 are larger than the diameter of the positioning hole 61. Accordingly, the bottom surface of the upper retaining ring 52 can rest on the top surface of the top wall of the grass collecting unit 60 so as to prevent the upright body 51 from falling into the grass collecting unit 60. The top surface of the lower retaining ring 53 can rest on the bottom surface of the top wall of the grass collecting unit 60 so as to prevent removal of the upright body 51 from the top wall of the grass collecting unit 60. When grass within the grass collecting unit 60 clogs the ventilation holes (not shown), air pressure within the grass collecting unit 60 is increased, thereby pushing upward and protruding the upright body 51 from the top wall of the grass collecting unit 60. In this way, a user can determine when adjustment of the amount of the collected grass within the grass collecting unit 60 is required.

With this invention thus explained, it is apparent that numerous modifications and variations can be made without departing from the scope and spirit of this invention. It is therefore intended that this invention be limited only as indicated in the appended claims.

I claim:

1. A lawn mower including a blade support with a recess which is formed in a bottom side of said blade support and which has an outlet portion, a blade mounted rotatably within said recess, and a grass collecting unit having an inlet portion communicated with said outlet portion of said recess so as to collect grass that was cut from a lawn with use of said blade, and a plurality of ventilation holes formed through a wall of said grass collecting unit so as to reduce air pressure inside said grass collecting unit;

wherein the improvement comprises:
said grass collecting unit having a top wall and a positioning hole formed through said top wall, said lawn mower further having a grass indicating unit which includes a body member disposed in said positioning hole and capable of being pushed upward relative to said top wall of said grass collecting unit by virtue of said air pressure inside said grass collecting unit, and a positioning assembly mounted securely on said body member so as to prevent removal of said body member from said top wall of said grass indicating unit, whereby, when grass within said grass collecting unit clogs said ventilation holes, said air pressure within said grass collecting unit is increased so as to push upward and protrude said body member from said top wall of said grass collecting unit.

2. A lawn mower as claimed in claim 1, wherein said positioning hole of said grass collecting unit is rectangular, said body member of said grass indicating unit including a generally vertical front wall which has a height that is equal to thickness of said top wall of said grass collecting unit and which is positioned in said positioning hole near said inlet portion of said grass collecting unit, a generally vertical rear wall which has a height greater than that of said front wall and which has a curved outer surface that enables said rear wall to rotate relative to said top wall of said grass collecting unit, a scale portion provided on said curved outer surface of said rear wall so as to show an approximate amount of said grass within said grass collecting unit, a pair of generally trapezoid side walls interconnecting said rear and front walls, a top wall mounted securely on top ends of said rear and front and side walls, and a bottom wall mounted securely on bottom ends of said rear and front and side walls, said positioning assembly of said grass indicating unit including a pair of first positioning plates which project outward from top ends of said side walls of said body member respectively and which rest on a top surface of said top wall of said grass collecting unit so as to prevent said body member from falling into said grass collecting unit, and a pair of second positioning plates which project outward from bottom ends of said side walls of said body member respectively and which rest on a bottom surface of said top wall of said grass collecting unit so as to prevent removal of said body member from said top wall of said grass collecting unit.

3. A lawn mower as claimed in claim 1, wherein said positioning hole of said grass collecting unit is rectangular, said body member of said grass indicating unit including a pair of generally trapezoid side walls each of which having a rear side that has a height greater than thickness of said top wall of said grass collecting unit and a front side that is located at a position near said inlet portion of said grass collecting unit and that has a height equal to said thickness of said top wall of said grass collecting unit, a top wall interconnecting top ends of said side walls, a rear wall interconnecting said rear sides of said side walls and having a curved outer surface which enables said rear wall to rotate relative to said top wall of said grass collecting unit, and a scale portion provided on said curved outer surface of said rear wall so as to show an approximate amount of said grass within said grass collecting unit, said positioning assembly of said grass indicating unit including a pair of first positioning plates which project outward from top ends of said side walls of said body member respectively and which rest on a top surface of said top wall of said grass collecting unit so as to prevent said body member from falling into said grass collecting unit, and a pair of second positioning plates which project outward from bottom ends of said side walls of said body member respectively and which rest on a bottom surface of said top wall of said grass collecting unit so as to prevent removal of said body member from said top wall of said grass collecting unit.

4. A lawn mower as claimed in claim 1, wherein said positioning hole of said grass collecting unit is circular, said body member including an elongated upright body which is sized so as to be movable through said positioning hole and which has two annular grooves respectively formed in upper and lower end portions thereof, an upper retaining ring engaging one of said annular grooves which is located in the upper end portion of said upright body, and a lower retaining ring engaging the other one of said annular grooves, outer diameters of said upper and lower retaining rings being larger than diameter of said positioning hole, said upper retaining ring having a bottom surface which rests on a top surface of said top wall of said grass collecting unit so as to prevent said body member from falling into said grass collecting unit, said lower retaining ring having a top surface which rests on a bottom surface of said top wall of said grass collecting unit so as to prevent removal of said body member from said top wall of said grass collecting unit.

* * * * *

UNITED STATES PATENT AND TRADEMARK OFFICE
CERTIFICATE OF CORRECTION

PATENT NO. : 5,361,568
DATED     : November 8, 1994
INVENTOR(S) : Yung-Ching Lin It is certified that error appears in the above-indentified patent and that said Letters Patent is hereby corrected as shown below:

<u>On the Title Page</u>

In column 1, in line 3 of the "Inventor" information, after "Hsien," insert --Taiwan.

Signed and Sealed this

Thirtieth Day of May, 1995

Attest:

BRUCE LEHMAN

Attesting Officer          Commissioner of Patents and Trademarks